April 30, 1935. F. W. SMITH 1,999,485
BUSINESS AND DISCOUNT CARD
Filed March 28, 1933
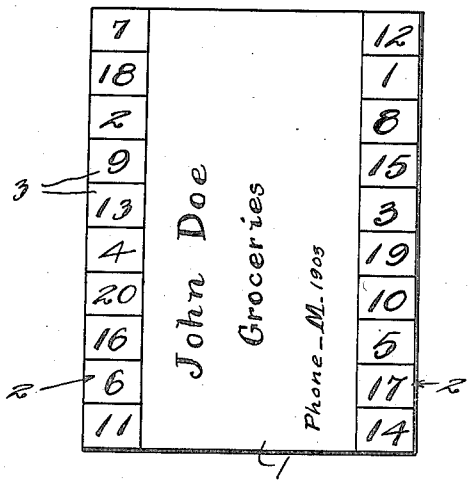
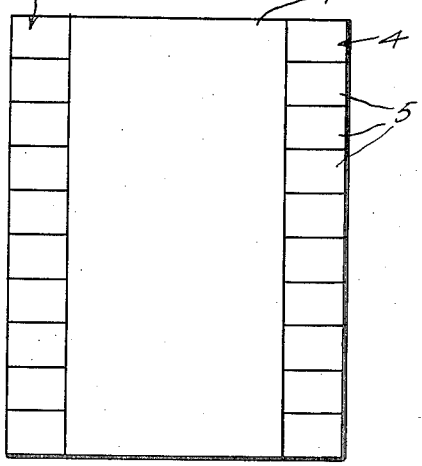
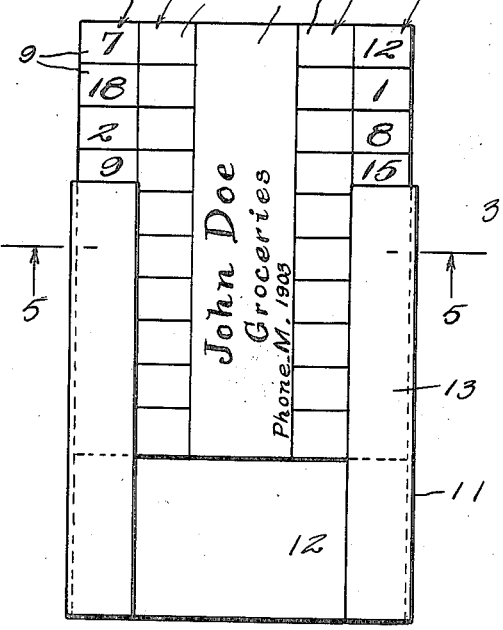
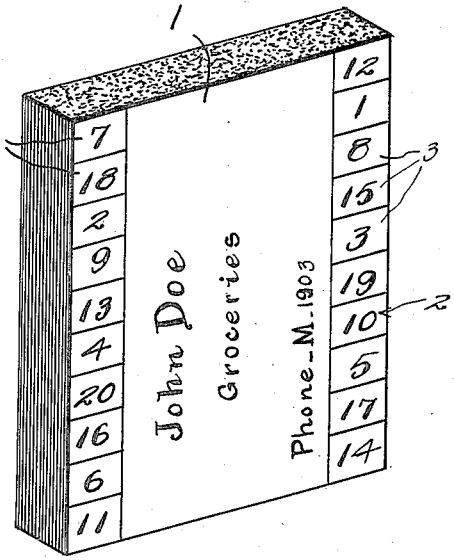
Inventor
F. W. Smith
By Watson E. Coleman
Attorney Patented Apr. 30, 1935

1,999,485

UNITED STATES PATENT OFFICE 1,999,485

BUSINESS AND DISCOUNT CARD

Frank W. Smith, Buffalo, N. Y.

Application March 28, 1933, Serial No. 663,225

2 Claims. (Cl. 273—138)

This invention relates to improvements in devices for use in trade and pertains particularly to an improved means for giving a discount to a customer on goods purchased.

The primary object of the present invention is to provide a method involving an element of chance, of giving customers of stores, garages, service stations or other places of business an opportunity to obtain a refund upon a purchase.

Another object of the invention is to provide an improved card designed for use in carrying out this method, which card is also adapted for use as a business card.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in plan of the front face of a form of the card employed in carrying out the present method;

Figure 2 is a view in plan of the back or reverse side of the card;

Figure 3 illustrates a method of securing a number of cards together in the form of a pad with only the front face of one card exposed at a time;

Figure 4 illustrates a modified form of card and method of handling the same whereby the number carrying columns thereof may be kept covered while the card is being marked by a customer;

Figure 5 is a view in section taken upon the line 5—5 of Figure 4.

Referring now more particularly to the drawing wherein like numerals of reference indicate corresponding parts throughout the several views, the numeral 1 indicates one form of card employed in carrying out the present method of giving customers of a business establishment an opportunity of obtaining the refund of the purchase price of an article. This card as shown, is ruled off upon one face to provide the two columns, each of which is indicated by the numeral 2, which are in turn transversely divided to form the areas 3. These columns of areas are placed upon the front face of the card and between the columns the space may be utilized by printing advertising matter thereon with the name of the business man employing the same so that the card after being used may be kept by the customer as a business card. Upon the opposite side or back of the card, as illustrated in Figure 2, there are two columns, each of which is indicated by the numeral 4, which are transversely divided to form the areas 5 and these columns and the areas 5 are arranged to coincide with the columns and areas 2—3 upon the front face. In addition the areas upon the rear face of the card are each provided with a numeral which is one of a selected series, as for example, a series running from one to twenty. The numerals are not, however, consecutively arranged in the columns, as illustrated.

In carrying out the method of using the cards a customer of a business establishment is handed one of the cards after his purchases have been made and is told to place any numeral selected in the series from one to twenty in one of the areas 3 of one of the columns upon the front face of the card, care being taken that the customer does not see the reverse face of the card. Should the customer select, for example, the numeral 10, this is placed in one of the areas 3 and if it is found upon turning the card over that the corresponding area upon the under face of the card contains the same numeral then the purchase price of the goods bought by the customer is returned or some other concession is made such, for example, as giving the customer back twenty, thirty or fifty per cent of the price of the goods purchased. As will be understood, of course, if the customer fails to place the numeral selected in an area corresponding with the area upon the back face of the card containing the same numeral then no refund is made. In either case whether a refund is made or not the customer retains the card which bears the dealer's name and address and possibly advertising matter, as a business card.

In order that the cards may be conveniently handled without the possibility of the customer seeing the numeral bearing faces thereof a number of the cards may be secured together in the form of a pad as illustrated in Figure 3 with the top or blank faces exposed. The customer will then mark the selected numeral in the selected area and then tear off the card in order to see the under face to determine whether or not the right numeral and corresponding area has been selected.

In Figure 4 a modified form of the invention is illustrated. In this form the card which is indicated by the numeral 6 is provided along each longitudinal edge with two parallel columns which are indicated by the numerals 7 and 8 and each of these columns is transversely ruled to provide the areas 9 and 10 respectively. The areas of the outer columns 7 are provided with the numerals and the inner columns are left blank for the use of the customer. With each card is provided an envelope 11 which is open at one end and which also has a central longitudinally extending window 12. The card 6 is slipped into the open end of the envelope and the window 12 exposes only the inner columns 8 and the central portion of the card, the parts 13 of the envelope which border the window opening covering the numeral bearing columns 7. It will thus be seen that when a customer is handed one of these cards in its envelope only the blank squares 10 in the columns 8 will be on view so that the selected numeral may be placed in a selected area without the customer knowing whether the adjacent area contains the same numeral or not. This is determined, as will be obvious, by drawing the card out of the envelope until the desired area is exposed to view.

From the foregoing it will be readily seen that the cards herein described may be economically produced and may be made to perform the double function of a business card and means for giving a customer a discount upon purchases made.

In addition the cards may be distributed as an advertising medium for use as a game in the same manner as that in which it may be employed for the transaction of a business deal.

Having thus described the invention, what is claimed is:—

1. An article comprising a card marked off on one face to form two adjacent and complementary series of areas, and a carrier for the card having means arranged to completely cover one series of areas only when the card is placed therein, leaving the other series exposed to view.

2. An article comprising a card marked off on one face to form two adjacent and complementary series of areas, a case formed to receive the card and having an open side, and a flange extending inwardly from and along said open side said flange being equal in width with one series of areas and normally covering the said one series only of said areas, the other series being exposed to view.

FRANK W. SMITH.